United States Patent
Kobayashi

(10) Patent No.: US 7,809,466 B2
(45) Date of Patent: Oct. 5, 2010

(54) TRANSPORTATION SYSTEM AND TRANSPORTATION METHOD

(75) Inventor: Toyokazu Kobayashi, Inuyama (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 917 days.

(21) Appl. No.: 11/700,888

(22) Filed: Feb. 1, 2007

(65) Prior Publication Data

US 2007/0185604 A1 Aug. 9, 2007

(30) Foreign Application Priority Data

Feb. 3, 2006 (JP) .............................. 2006-026942

(51) Int. Cl.
*G06F 7/00* (2006.01)
(52) U.S. Cl. ..................... 700/213; 700/112; 701/23; 414/222.01
(58) Field of Classification Search ............... 700/213, 700/228, 112; 701/23; 414/222.01
See application file for complete search history.

(56) References Cited

U.S. PATENT DOCUMENTS

| 7,197,369 | B1* | 3/2007 | Chien et al. ................ 700/100 |
| 7,539,553 | B2* | 5/2009 | Chang et al. ................ 700/121 |
| 2001/0041948 | A1 | 11/2001 | Ross et al. | |
| 2004/0230334 | A1* | 11/2004 | Geismar et al. ............. 700/121 |
| 2005/0137990 | A1 | 6/2005 | Mayer et al. | |
| 2005/0139564 | A1 | 6/2005 | Nakao et al. | |
| 2005/0214103 | A1* | 9/2005 | Mizokawa et al. .......... 414/217 |
| 2006/0051188 | A1* | 3/2006 | Hoshino .................... 414/277 |
| 2006/0051192 | A1* | 3/2006 | Fujiki ....................... 414/626 |
| 2008/0051930 | A1* | 2/2008 | Oh et al. .................... 700/214 |
| 2008/0133041 | A1* | 6/2008 | Schmidt .................... 700/101 |
| 2009/0035102 | A1* | 2/2009 | Zimmerhackl et al. . 414/222.04 |
| 2009/0088895 | A1* | 4/2009 | Schmidt et al. ............. 700/228 |

FOREIGN PATENT DOCUMENTS

| CN | 1741052 A | 3/2006 |
| JP | 11-309650 A | 11/1999 |
| JP | 2003-212112 A | 7/2003 |
| JP | 2006-54389 A | 2/2006 |
| WO | WO 03/019425 A1 | 3/2003 |
| WO | WO 03/034293 A | 4/2003 |
| WO | WO 2006/069601 A2 | 7/2006 |

OTHER PUBLICATIONS

European Search Report dated Sep. 6, 2007, issued in corresponding European patent No. 07001616.
Japanese Office Action date Sep. 3, 2009, issued in corresponding Japanese Patent Application No. 2006-026942.

* cited by examiner

*Primary Examiner*—Gene Crawford
*Assistant Examiner*—Ramya Prakasam
(74) *Attorney, Agent, or Firm*—Westerman, Hattori, Daniels & Adrian, LLP

(57) ABSTRACT

In the case of transporting an article to a load port which is occupied by another article, at the time of generating a transportation command, estimated arrival time T1 when the article arrives at the load port and estimated removal time T2 when the article which occupies the load port is removed are compared with each other. If the time T2 is earlier than the time T1, a transportation command for transporting the article to the load port is assigned. If the time t2 is later than the time T1, a transportation command for transporting the article to a buffer on the upstream side of the load port is assigned.

3 Claims, 4 Drawing Sheets

TRANSPORTATION SYSTEM AND TRANSPORTATION METHOD

TECHNICAL FIELD

The present invention relates to a transportation system and a transportation method, and in particular, the present invention relates to a technique of assigning a transportation command by predicting that a load port which is occupied at the time of assigning the transportation command becomes vacant when an article arrives at the load port.

BACKGROUND ART

The applicant proposed to provide buffers on sides or under a travel route in an overhead traveling vehicle system for temporarily storing articles (Japanese Laid-Open Patent Publication No. 2003-212112).

SUMMARY OF THE INVENTION

An object the present invention is to increase the chances of direct transportation between load ports, and shorten a period of time required for transporting an article temporarily stored in a buffer to a load port, to improve the transportation efficiency.

Another object of the present invention is to enable accurate prediction of the time when a destination load port becomes available.

Still another object of the present invention is to maintain good transportation efficiency even if the time when a load port becomes available is different from the actual time.

According to the present invention, in a transportation system, a plurality of pieces of processing equipment and a plurality of buffers are provided along a travel route for transportation vehicles, and a controller issues a transportation command for a transportation vehicle to transport an article. The transportation system comprises:

prediction means for predicting whether unloading at a load port of a destination point becomes possible or not within a predetermined time from arrival of the transportation vehicle at the load port; and assignment means for assigning the transportation command to the transportation vehicle such that, if it is predicted that unloading at the load port becomes possible within the predetermined time, the article is transported to the load port as the destination point, and if it is predicted that unloading at the load port becomes possible after the predetermined time, the article is transported to a buffer as the destination point.

Preferably, the prediction means calculates estimated arrival time when the transportation vehicle loaded with the article as a first transportation vehicle arrives at the load port, and estimated removal time when a second article is transported from the load port by a second transportation vehicle, and unloading at the load port becomes possible. The estimated removable time is calculated by adding a period of time required for the second transportation vehicle to arrive at the load port, and a period of time required for transferring the second article from the load port to the second transportation vehicle, to estimated time when the second article is transported from the load port; and the assignment means assigns the transportation command such that, if the estimated removal time is earlier than time after elapse of the predetermined time from the estimated arrival time, the article is transported to the load port as the destination point, and if the estimated removal time is later than the time after elapse of the predetermined time from the estimated arrival time, the article is transported to the buffer as the destination point.

Preferably, the transportation system further comprises means for changing a transportation command for the first transportation vehicle to transport the first article to a buffer on a side of the load port or a buffer on an upstream side of the load port, and changing a transportation command for the second transportation vehicle to transport the first article from the buffer to the load port, if the second article has not been transported from the load port by the second transportation vehicle when the first transportation vehicle arrives at the load port.

Further according to the present invention, in a method of transporting an article by providing a plurality of pieces of processing equipment and a plurality of buffers along a travel route of transportation vehicles, and assigning a transportation command for the article from a controller to a transportation vehicle, the controller predicts whether unloading at a load port of a destination point becomes possible or not within a predetermined time from arrival of the transportation vehicle at the load port;

and assigns the transportation command to the transportation vehicle such that, if the controller predicts that unloading at the load port becomes possible within the predetermined time, the article is transported to the load port as the destination point, and if the controller predicts that unloading at the load port does not become possible within the predetermined time, the article is transported to a buffer as the destination point.

In the specification, description about the transportation system is directly applicable to the transportation method.

The predetermined time herein is, for example, a period of time determined by settings of the controller, and corresponds to an adjustment period in an embodiment as described later. The predetermined time is a kind of margin for compensating the uncertainty in the estimated arrival time of the article. Assuming that the predetermined time is 0, the estimate time of arrival of the transportation vehicle and the estimated time when unloading at the load port become possible are directly compared with each other. If the predetermined time becomes large, the destination point of the article should be load port. The transportation may wait on the upstream of the load port or the like, as long as the wait time is within the predetermined time.

ADVANTAGES OF THE INVENTION

In the present invention, even for the load port which is not available at the time of assigning a transportation command, if it is predicted that unloading at the load port become possible within predetermined time from the arrival time of the article, it is possible to directly transport the article to the load port.

Preferably, even in the case where the second article needs to be transported from the load port beforehand, it is possible to easily calculate the correct estimated removal time when the second article has been removed from the load port by the second transportation vehicle, and unloading at the load port becomes possible. Therefore, even in this case, it is possible to efficiently determine whether the article should be transported to the load port as the destination point or the buffer as the destination point, and assign the transportation command based on the determination.

Further, preferably, when the transportation vehicle loaded with the article arrives at the destination load port, if the second article has not been removed from the load port, the transportation command is changed to unload the article to a buffer on a side or an upstream side of the load port. The transportation command for the transportation vehicle which has been initially scheduled to transport the article from the load port is changed for transporting the article from the buffer to the load port. In the case where the buffer on the side can be utilized, the additional travel period is small. Even in the case of using the buffer on the upstream side, the travel period from the buffer to the load port is small. Further, both of transportation from the load port, and transportation from the buffer to the load port can be handled by two transportation vehicles which have been used in the prediction transportation.

EMBODIMENT

Figure 1:
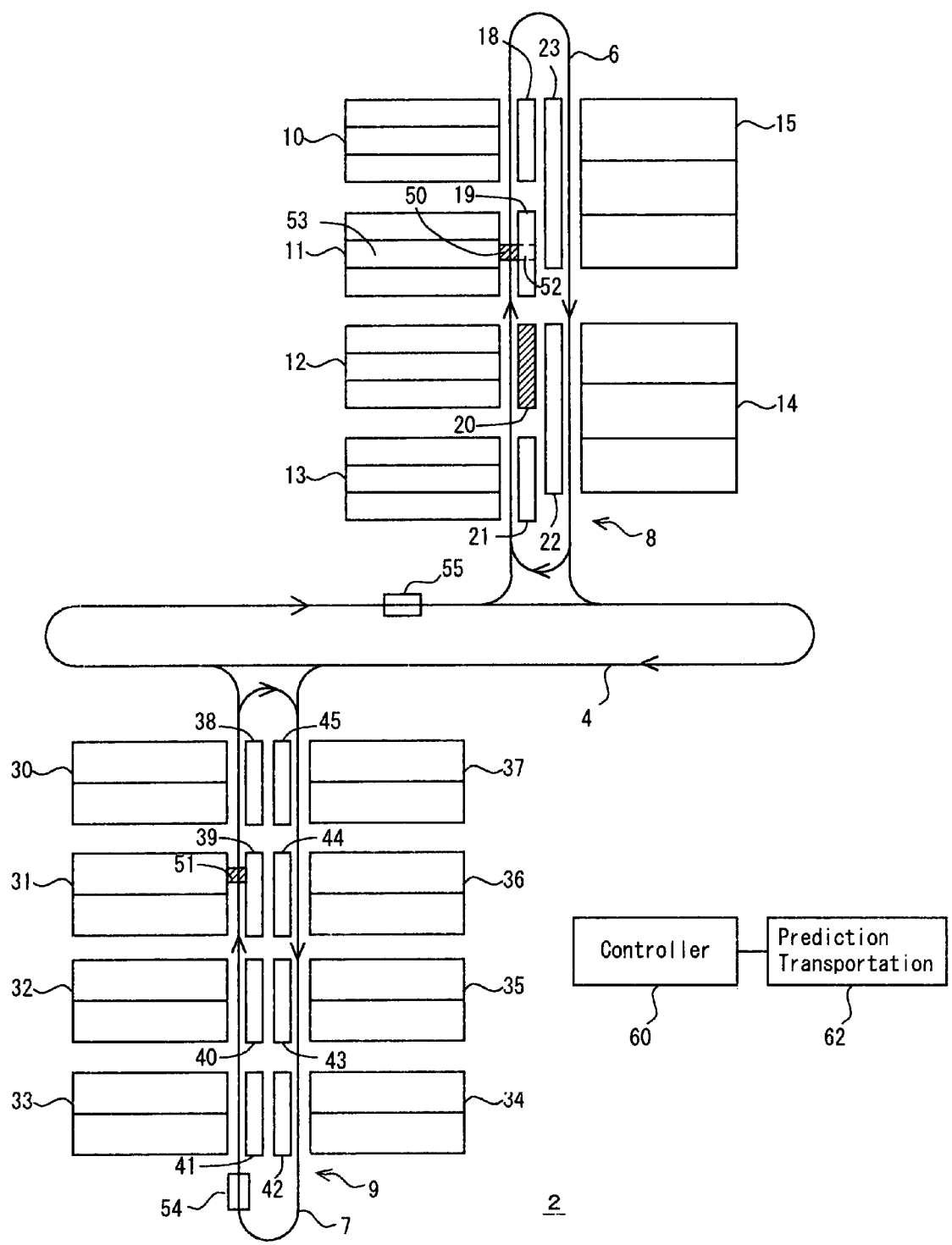
FIG. 1 is a plan view showing a layout of a transportation system according to an embodiment.
Figure 2:
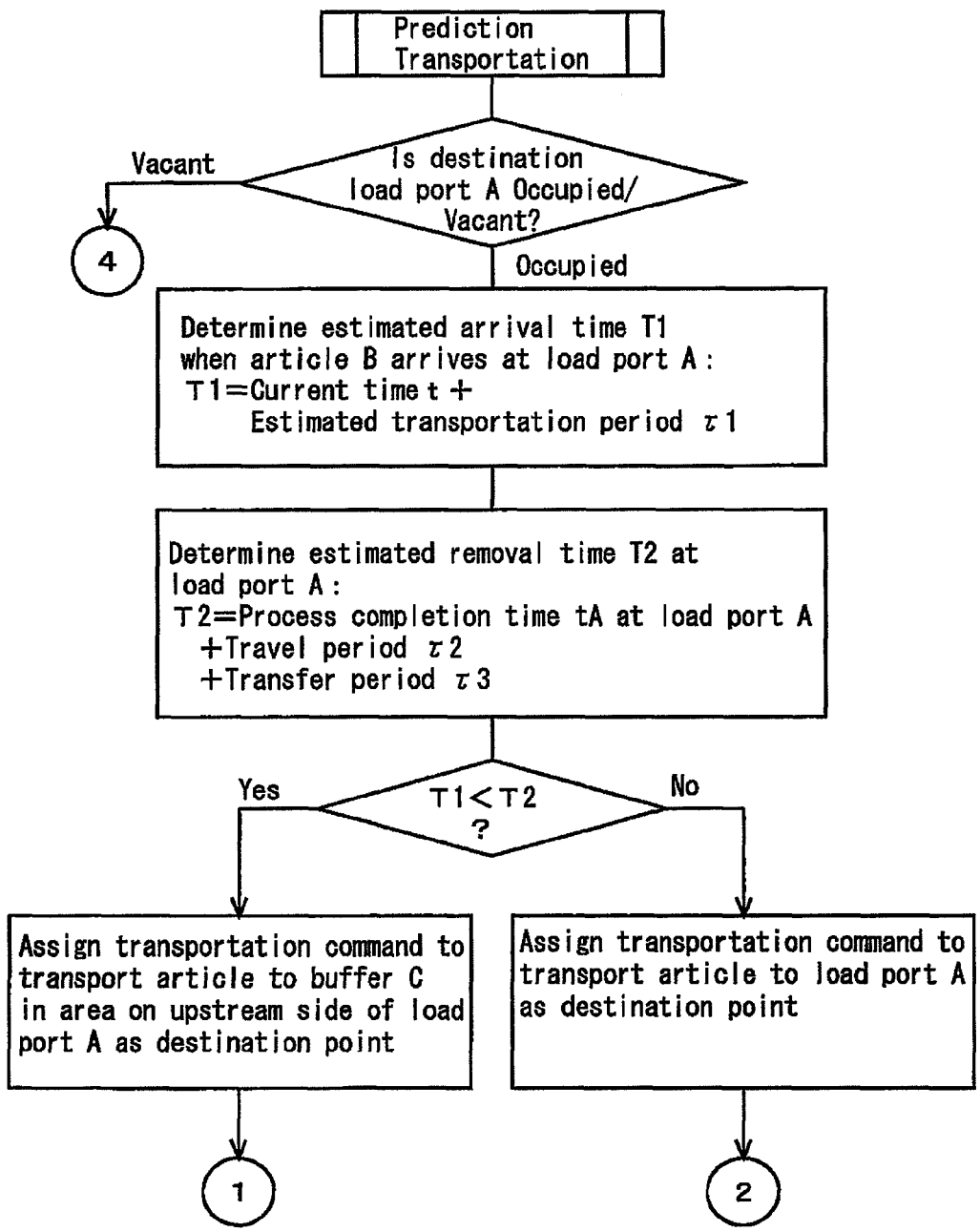
FIG. 2 is a flow chart showing a prediction transportation algorithm according to the embodiment.
Figure 3:
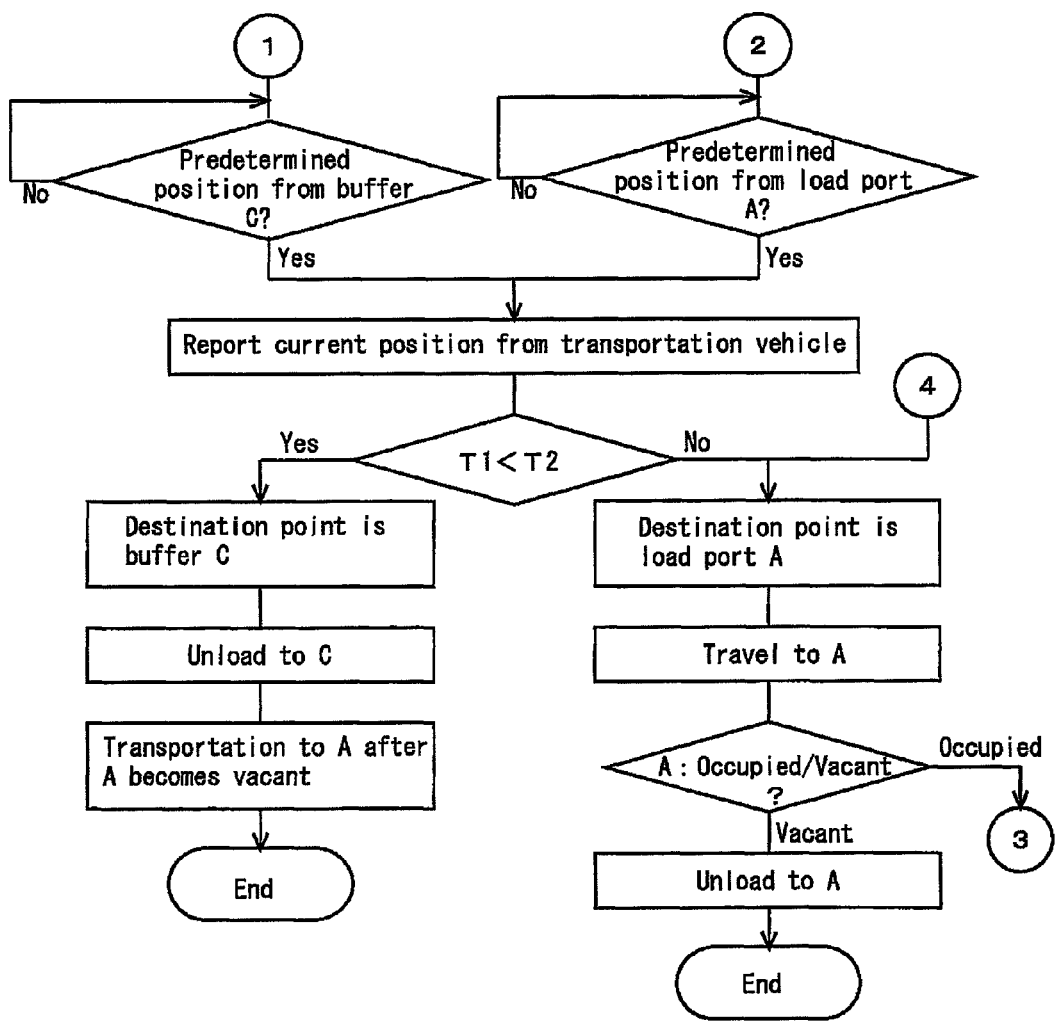
FIG. 3 is a flow chart showing the prediction transportation algorithm after steps in FIG. 2.
Figure 4:
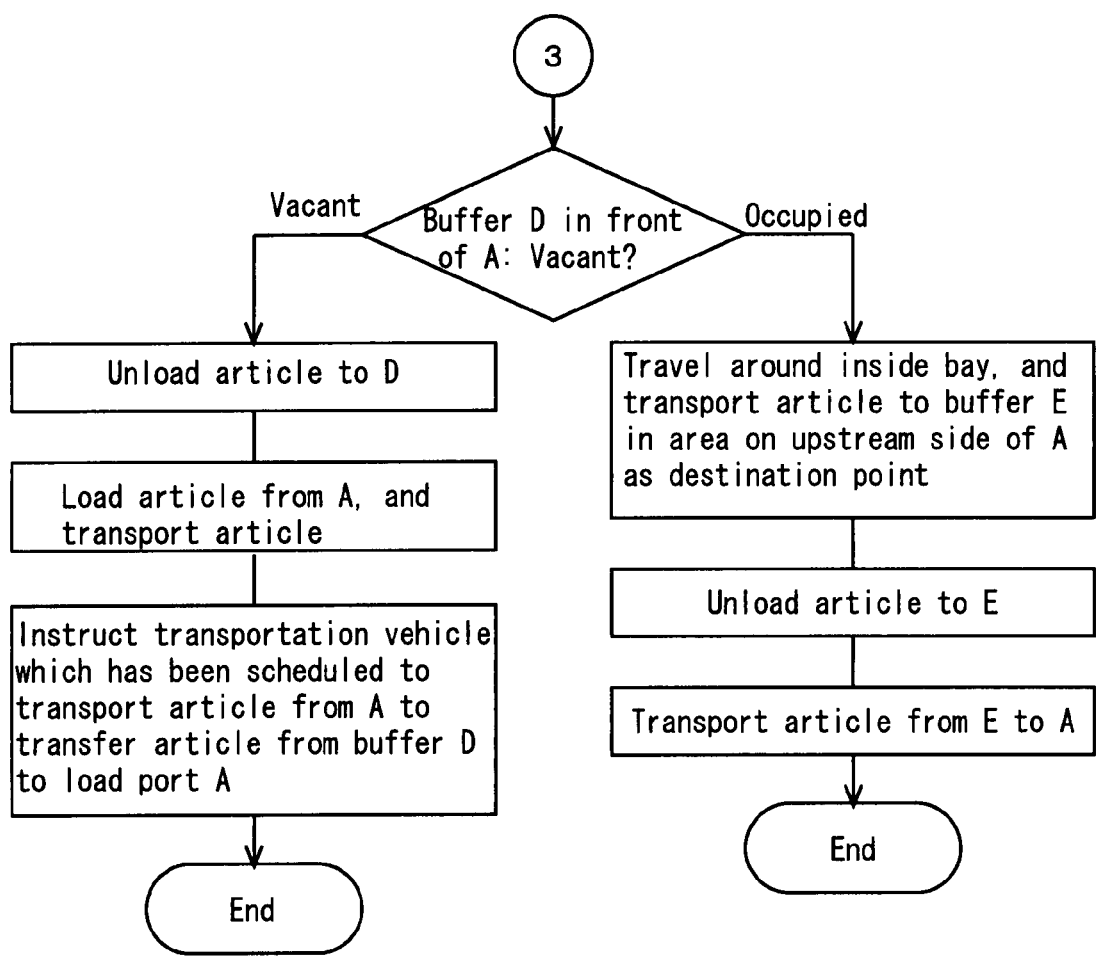
FIG. 4 is a flow chart showing the prediction transportation algorithm after steps in FIG. 3.

FIGS. 1 to 4 show a transportation system and an algorithm of prediction transportation according to an embodiment. Though the embodiment will be described taking an overhead traveling vehicle system 2 as an example, the present invention is applicable to a system of rail vehicles on the ground, and a system of automated non-rail transportation vehicles on the ground. For example, the overhead traveling vehicle system 2 is installed in a clean room and transports cassettes accommodating semiconductor substrates of works-in-progress in a semiconductor plant or the like. The overhead traveling vehicle system 2 includes travel routes such as an inter-bay route 4 as a main route and intra-bay routes 6 and 7 connected to the inter-bay route 4. In FIG. 1, though the intra-bay routes 6 and 7 respectively have a loop shape where vehicles can travel around the loop, the intra-bay routes 6 and 7 may respectively have a U-shape which does not includes any loop.

Reference numerals 8 and 9 denote bays. The intra-bay routes 6 and 7 are provided for transportation in the bays 8 and 9, respectively. Reference numerals 10 to 15 denote processing equipment groups each including one or a plurality of pieces of processing equipment. The processing equipment includes an inspection apparatus. In the bay 8, buffer groups 18 to 23 for temporarily storing the cassettes are provided in correspondence with the respective processing equipment groups 10 to 15. For example, the buffer groups 18 to 23 are groups of buffers provided on a side of the intra-bay route 6. Additionally, buffers can be provided under the intra-bay route 6. Likewise, in the bay 9, processing equipment groups 30 to 37 and buffer groups 38 to 45 are provided along the intra-bay route 7. The bays 8 and 9 are divided into a plurality of areas for the respective processing equipment groups 10 to 15, and 30 to 37. The buffer groups 18 to 23, and 38 to 45 are provided in the respective areas.

Reference numerals 50 and 51 denote load ports. A reference numeral 52 denotes a buffer provided at a position in front of the load port 50. In this case, the buffer group 20 is provided immediately on the upstream side of the load port 50. A reference numeral 53 denotes processing equipment having the load port 50. Reference numerals 54 and 55 denote overhead traveling vehicles, and a reference numeral 60 denotes a controller. The controller 60 controls the overhead traveling vehicle system 2, accepts requests from a production control system (not shown) to transport articles, assigns the transportation requests from the production control system as transportation commands to the overhead traveling vehicles 54 and 55 or the like to execute the transportation commands, and reports the results of command execution. Data of the transportation requests from the production control system include IDs of articles to be transported, IDs of load ports as From positions (departure points), and IDs of load ports as To positions (destination points). Further, the production control system notifies the controller 60 of statuses of the load ports at the To positions, and estimated times of transporting articles from the processing equipment to the load ports at the To positions.

In response to the transportation requests, the controller 60 issues transportation commands such as a transportation command for transportation from the load port at the From position to the load port at the To position, or a transportation command for transportation from the load port at the From position to a buffer on the upstream side of the load port of the next destination point. In the case where an article is transported to a buffer, the time when the load port at the next destination point becomes vacant is awaited. Then, a transportation command for transporting the article from the buffer to the load port at the To position is assigned to another overhead traveling vehicle. Further, the controller manages the inventory of respective buffers. Inventory management data includes, e.g., addresses of buffers, data indicating the presence/absence of the articles, IDs of articles, IDs each indicating the load port at the next destination point of the article, and IDs each indicating the original load port from which the article was transported.

Now, it is assumed that an article is scheduled to be transported from the load port 51 to the load port 50, but the load port 50 is not available because another article which is currently processed at the processing equipment 53 is scheduled to be transported to the load port 50. In this case, in principle, the article is transported to any of the buffer groups 20, 21, 22, or the like on the upstream side of the load port 50, and the article is transported from the buffer after the load port 50 becomes vacant. However, if it is predicted that the load port 50 becomes vacant when the article from the load port 51 arrives at the load port 50, a transportation command for directly transporting the article from the load port 51 to the load port 50 is assigned. The process is referred to as the prediction transportation.

A prediction transportation management unit 62 compares estimated arrival time T1 when the article from the load port 51 arrives at the load port 50 and estimated removal time T2 when the article transported to the load port 50 from the processing equipment 53 is removed (taken away). If the time T1 is earlier than the time T2, a transportation command for transporting the article to a buffer on the upstream side of the load port 50 as the destination point is assigned to the overhead traveling vehicle. The case where the time T1 is earlier than the time T2 is referred to as T1<T2 in this specification. If T1≧T2, a transportation command for transporting the article to the load port 50 as the destination point is assigned to the overhead traveling vehicle. It is not likely that T1=T2. Therefore, if T1<T2, a transportation command for transporting the article to the buffer as the destination point may be assigned, and if T1>T2, a transportation command for transporting the article to the load port 50 as the destination point may be assigned. The determination as to whether the destination point is the buffer or the load port may not be made based on the criteria of whether T1<T2 or not, and may be made based on the criteria using a positive margin δ added to T2. If T1<T2++δ, the article is transported to the buffer, and if T1≧T2+δ, the article is transported to the load port. Hereinafter, an algorithm of the prediction transportation will be described with reference to FIGS. 2 through 4.

It is confirmed whether a destination load pot A is occupied or vacant. If the load port A is vacant, a transportation command for transporting an article B to the load port A as the To position is assigned as usual. If the load port A is occupied, the estimated arrival time T1 when the transported article B arrives at the load port A is calculated by adding an estimated transportation period τ1 required for transporting the article B to the load port A, to the current time t.

Next, the estimated removal time T2 when the article at the load port A is removed is calculated. The estimated removal time T2 is calculated by adding a travel period τ2 required for the arrival of an overhead traveling vehicle to which a transportation command for transporting the article from the load port A is assigned, and a transfer period τ3 required for transferring the article at the load port A, to process completion time tA at the load port A notified from the production control system, i.e., estimated time when the article which is currently processed at processing equipment is transported from the processing equipment to the load port A. The estimated removal time T2 is calculated assuming that the transportation command for transporting the article that was transported to the load port A is assigned to another overhead traveling vehicle at the process completion time tA. When the process completion time tA is determined, if the transportation command for transporting the article from the load port A is assigned to another overhead traveling vehicle, the estimated time T2 becomes the time calculated by adding the transfer period τ3 to the later one of the process completion time tA and the time calculated by adding the travel period τ2 to the current time. Since the controller stores data of the current positions or statuses of the respective overhead traveling vehicles, and the required travel period between the respective positions in the travel route, the travel period τ2 can be calculated easily. The transfer period τ3 is a constant which is not affected by the position of the load port.

In the case where T1<T2, a transportation command is assigned to the overhead traveling vehicle to transport the article to a buffer C on the upstream side of the load port A as the destination point. In the case where T1≧T2, a transportation command is assigned to the overhead traveling vehicle to transport the article to the load port A without passing through any buffer. After transportation of the article to the buffer C is assigned to the overhead traveling vehicle, the overhead traveling vehicle reports the current position to the controller at a predetermined position from which the overhead traveling vehicle can stop at the buffer C, or detects the current position of the overhead traveling vehicle using an ID reader or the like provided along the travel route. Further, also in the case where direct transportation to the load port A without passing through any buffer is assigned to the overhead traveling vehicle, the overhead traveling vehicle reports, or detects the current position at a predetermined position from which the overhead traveling vehicle can stop, e.g., at the buffer group on the immediately upstream side of the load port A. When the current position of the overhead traveling vehicle is found, the controller reconfirms whether T1<T2 or not. If T1<T2, the transportation command for transporting the article to the buffer C as the destination point is maintained or the transportation command for transporting the article to the load port A is changed. If T1≧T2, the transportation command for transporting the article to the load port A as the destination point is maintained, or the transportation command for transporting the article to the buffer C is changed. The process is referred to as reconfirmation. Since a buffer needs to be allocated immediately before the load port A, the process may be omitted. In the case of performing reconfirmation, even if the first destination point is the load port A, preferably, a buffer may be allocated in preparation for the change of the destination point. That is, the buffer is reserved, and not used for other applications.

In the case where the article is unloaded to the buffer C, after the load port A becomes vacant, the article is transported to the load port A. In general, in the case of transporting the article to the load port A by the prediction transportation, the load port A may be occupied when the overhead traveling vehicle arrives at the load port A. In this case, if the buffer D in front of the load port A is vacant, the transportation command is changed to unload the article to the buffer D, and then, the same overhead traveling vehicle loads the article from the load port A. For the overhead traveling vehicle to which a transportation command for transporting the article from the load port A is assigned, the original transportation command is changed to transfer the article from the buffer D to the load port A. At this time, in order to avoid further travel of the overhead traveling vehicle around the travel route, the buffer D in front of the load buffer A, instead of the buffer on the upstream side of the load port A is used.

In the case where the buffer D in front of the load port A is not available, a buffer in an area on the upstream side of the area of the load port A, e.g., a buffer E on the immediately upstream side of the area of the load port A is assigned to temporarily store the article. If there are no empty buffers, then, a buffer in an area on the further upstream side is assigned. Empty buffers are searched, and the article is temporarily placed, e.g., in the buffer E. Then, a transportation command for allowing the overhead traveling vehicle, which has unloaded the article, to load the article at the load port A and to transport the article is assigned. Further, for the overhead traveling vehicle to which a transportation command for transporting the article from the load port A is assigned, the original transportation command is changed to transfer the article from the buffer E to the load port A. The load port A may become vacant while the overhead traveling vehicle travels around the travel route. Therefore, at a suitable position from which the overhead traveling vehicle can stop at the buffer E, reconfirmation as to whether the overhead traveling vehicle should unload the article to the buffer E or unload the article to the load port A may be made. If the layout of the transportation system is simple, it is sufficient to determine the leading/following relationship between the overhead traveling vehicle for removing the article from the load port and the overhead traveling vehicle for transporting the article to the same load port, and it is not necessary to determine the estimated arrival time.

In the embodiment, the following advantages are obtained.

(1) For the load port which is occupied at the time of assigning a transportation command, prediction transportation is carried out. As a result, the chance of direct transportation between the load ports is increased, and the transportation efficiency is improved.

(2) Buffers on the upstream side, preferably, buffers on the immediately upstream side of the destination load port is used to shift the transfer position of the article to/from the buffer from the destination load port position, and the period of time the travel route is occupied at the same position is reduced. Thus, congestion in the travel route is reduced.

(3) When a load port is occupied during travel in prediction transportation, by using a buffer in front of the load port, travel for the travel distance corresponding to the distance to travel once around the intra-bay route is omitted. Even if the buffer in front of the destination load port is not available, by utilizing a buffer on the upstream side of the destination load port, when the load port becomes vacant, the article can be promptly transported to the load port.

(4) By performing reconfirmation before arrival at the estimation destination point, the probability of failure in prediction is reduced.

In the embodiment, in order to reduce the period of time required for the overhead traveling vehicle which is scheduled to unload the article to the load port to wait until the load port becomes vacant, if the overhead traveling vehicle which is scheduled to remove the article from the load port does not remove the article and does not arrive at the load port before the estimated removal time, the overhead traveling vehicle which is scheduled to unload the article to the load port may unload the article to the buffer.

The overhead traveling vehicle which is scheduled to unload the article to the load port may wait at a suitable position, e.g., on the upstream side of the load port, as long as the wait period is short, until the overhead traveling vehicle which is scheduled to remove the article from the load port removes the article from the load port.

The estimated removal time T2 may be calculated by adding the transfer period τ3 and an adjustment period τ4 to the later one of the process completion time tA at the load port and the time calculated by adding the travel period τ2 to the current time. For example, the adjustment period τ4 is 10 to 90 seconds. Preferably, the adjustment period τ4 is about 30 seconds. In an extreme case, the adjustment period τ4 is zero second.

For the purpose of simplicity, in FIG. 1, the inter-bay route 4, and the intra-bay routes 6 and 7 do not include any shortcuts. However, the inter-bay route 4, and the intra-bay routes 6 and 7 may have branch sections to include shortcuts.

The overhead traveling vehicle which is scheduled to unload the article to the load port may follow the overhead traveling vehicle which is scheduled to transport the article from the load port so that as soon as the article is transported from the load port, the next article can be transported to the load port. In this manner, it is possible to reduce the time of replacing the articles at the load port.

Description of Reference Numerals 2 overhead traveling vehicle system
4 inter-bay route
6, 7 inter-bay route
8, 9 bay
10 to 15 processing equipment group
18 to 23 buffer group
30 to 37 processing equipment group
38 to 45 buffer group
50 destination load port
51 departure load port
52 buffer
53 processing equipment
54, 55 overhead traveling vehicle
60 controller
62 prediction transportation management unit
T1 estimated arrival time
T2 estimated removal time

The invention claimed is:

1. A transportation system, comprising:

prediction means for predicting whether unloading at a load port of a destination point becomes possible or not within a predetermined time from arrival of a transportation vehicle at the load port; and assignment means for assigning a transportation command to the transportation vehicle such that, if it is predicted that unloading at the load port becomes possible within the predetermined time, an article is transported to the load port as the destination point, and if it is predicted that unloading at the load port becomes possible after the predetermined time, the article is transported to a buffer as the destination point, wherein the prediction means calculates an estimated arrival time corresponding to a time when the transportation vehicle loaded with the article as a first transportation vehicle arrives at the load port, wherein the prediction means calculates an estimated removal time corresponding to a time when a second article is transported from the load port by a second transportation vehicle, wherein the estimated removal time is calculated by adding a period of time required for the second transportation vehicle to arrive at the load port, and a period of time required for transferring the second article from the load port to the second transportation vehicle, to an estimated time when the second article is transported from a processing device to the load port, wherein the assignment means assigns the transportation command such that, if the estimated removal time is earlier than a time after elapse of the predetermined time from the estimated arrival time, the article is transported to the load port as the destination point, and if the estimated removal time is later than the time after elapse of the predetermined time from the estimated arrival time, the article is transported to the buffer as the destination point, and wherein a plurality of pieces of processing equipment and a plurality of buffers are provided along a travel route for transportation vehicles, and a controller issues a transportation command for the transportation vehicle to transport the article.

2. A transportation system, comprising:

prediction means for predicting whether unloading at a load port of a destination point becomes possible or not within a predetermined time from arrival of a transportation vehicle at the load port; and assignment means for assigning a transportation command to the transportation vehicle such that, if it is predicted that unloading at the load port becomes possible within the predetermined time, an article is transported to the load port as the destination point, and if it is predicted that unloading at the load port becomes possible after the predetermined time, the article is transported to a buffer as the destination point, and means for changing a transportation command for a first transportation vehicle to transport a first article to a buffer on a side of the load port or a buffer on an upstream side of the load port, and changing a transportation command for a second transportation vehicle to transport the first article from the buffer to the load port, if a second article has not been transported from the load port by the second transportation vehicle when the first transportation vehicle arrives at the load port, wherein the prediction means calculates an estimated arrival time corresponding to a time when the transportation vehicle loaded with the article as a first transportation vehicle arrives at the load port, wherein the prediction means calculates estimated removal time corresponding to a time when a second article is transported from the load port by a second transportation vehicle, wherein the estimated removal time is calculated by adding a period of time required for the second transportation vehicle to arrive at the load port, and a period of time required for transferring the second article from the load port to the second transportation vehicle, to an estimated time when the second article is transported from a processing device to the load port, wherein the assignment means assigns the transportation command such that, if the estimated removal time is earlier than a time after elapse of the predetermined time from the estimated arrival time, the article is transported to the load port as the destination point, and if the estimated removal time is later than the time after elapse of the predetermined time from the estimated arrival time, the article is transported to the buffer as the destination point, and wherein a plurality of pieces of processing equipment and a plurality of buffers are provided along a travel route for transportation vehicles, and a controller issues a transportation command for the transportation vehicle to transport the article.

3. A method of transporting an article, comprising:

providing a plurality of pieces of processing equipment and a plurality of buffers along a travel route of transportation vehicles, and assigning a transportation command for the article from a controller to a transportation vehicle, wherein the controller predicts whether unloading at a load port of a destination point becomes possible or not within a predetermined time from arrival of the transportation vehicle at the load port; and wherein the controller assigns the transportation command to the transportation vehicle such that, if the controller predicts that unloading at the load port becomes possible within the predetermined time, the article is transported to the load port as the destination point, and if the controller predicts that unloading at the load port does not become possible within the predetermined time, the article is transported to a buffer as the destination point, wherein the controller calculates an estimated arrival time corresponding to a time when the transportation vehicle loaded with the article as a first transportation vehicle arrives at the load port, wherein the controller calculates estimated removal time corresponding to a time when a second article is transported from the load port by a second transportation vehicle, wherein the estimated removal time is calculated by adding a period of time required for the second transportation vehicle to arrive at the load port, and a period of time required for transferring the second article from the load port to the second transportation vehicle, to an estimated time when the second article is transported from a processing device to the load port, and wherein the controller assigns the transportation command such that, if the estimated removal time is earlier than a time after elapse of the predetermined time from the estimated arrival time, the article is transported to the load port as the destination point, and if the estimated removal time is later than the time after elapse of the predetermined time from the estimated arrival time, the article is transported to the buffer as the destination point.

* * * * *